United States Patent Office 3,168,526
Patented Feb. 2, 1965

3,168,526
DERIVATIVES OF 3-(2-NITROETHYL)-INDOLE
Richard V. Heinzelman, Kalamazoo Township, Kalamazoo County, Jacob Szmuszkovicz, Portage Township, Kalamazoo County, and William C. Anthony, Kalamazoo, Mich., assignors to The Upjohn Company, Kalamazoo, Mich., a corporation of Delaware
No Drawing. Filed Apr. 20, 1960, Ser. No. 23,359
4 Claims. (Cl. 260—319)

The present invention relates to novel 5-hydroxy-3-(2-amino-2-alkylethyl)-indoles, non-toxic acid addition salts thereof, and to novel intermediates useful in the preparation of the 5-hydroxy-3-(2-amino-2-alkylethyl)-indoles. The novel 5-hydroxy-3-(2-amino-2-alkylethyl)-indoles include the 5-hydroxy-3-(2-amino-2-monoalkylethyl)-indoles as well as the 5-hydroxy-3-(2-amino-2,2-dialkylethyl)-indoles. This application is a continuation-in-part of copending application Serial No. 684,422, filed September 17, 1957, now abandoned.

The novel 5-hydroxy-3-(2-amino-2-alkylethyl)-indoles of the present invention can be represented by the following general formula:

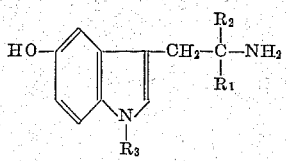

wherein $R_1$ represents an alkyl radical containing from one to four carbon atoms, inclusive, e.g., methyl, ethyl, propyl, butyl, and the like. $R_2$ and $R_3$ represent hydrogen or an alkyl radical containing from one to four carbon atoms, inclusive, e.g., methyl, ethyl, propyl, butyl, and the like.

In the preparation of the hydroxy substituted compounds it is advantageous to prepare a benzyloxy or an alkoxy derivative and subsequently convert the bnezyloxy or alkoxy radical to a hydroxy radical by various means which will be hereinafter recited. The alkoxy radical includes those radicals containing up to and including eight carbon atoms such as methoxy, ethoxy, isopropoxy, butoxy, octyloxy, and the like. The benzyloxy radical includes those radicals containing up to and including fifteen carbon atoms such as benzyloxy, benzhydryloxy, alkylbenzyloxy, e.g., para-methylbenzyloxy and para,para'-dimethylbenzhydryloxy, halobenzyloxy, e.g., para-chlorobenzyloxy and para,para'-dichlorobenzhydryloxy, alkoxybenzyloxy, e.g., para-methoxybenzyloxy and para,para'-dimethoxybenzhydryloxy, and the like.

The novel 5-hydroxy-3-(2-amino-2-monoalkylethyl)-indoles and intermediates useful in the preparation of the same can be produced by the series of reactions shown below wherein $R_1$ and $R_3$ have the values given above. $R_4$ represents a benzyloxy or an alkoxy radical, which radicals can be converted to the hydroxy radical as noted above.

(A)

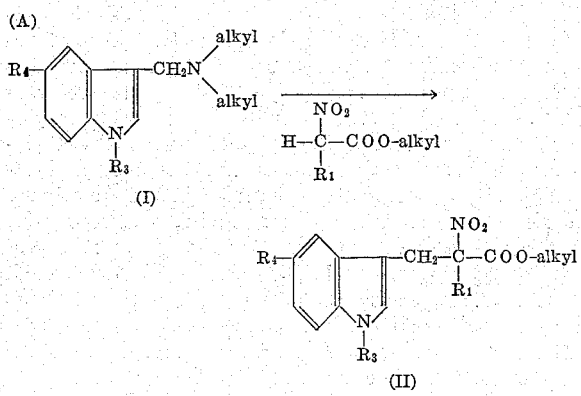

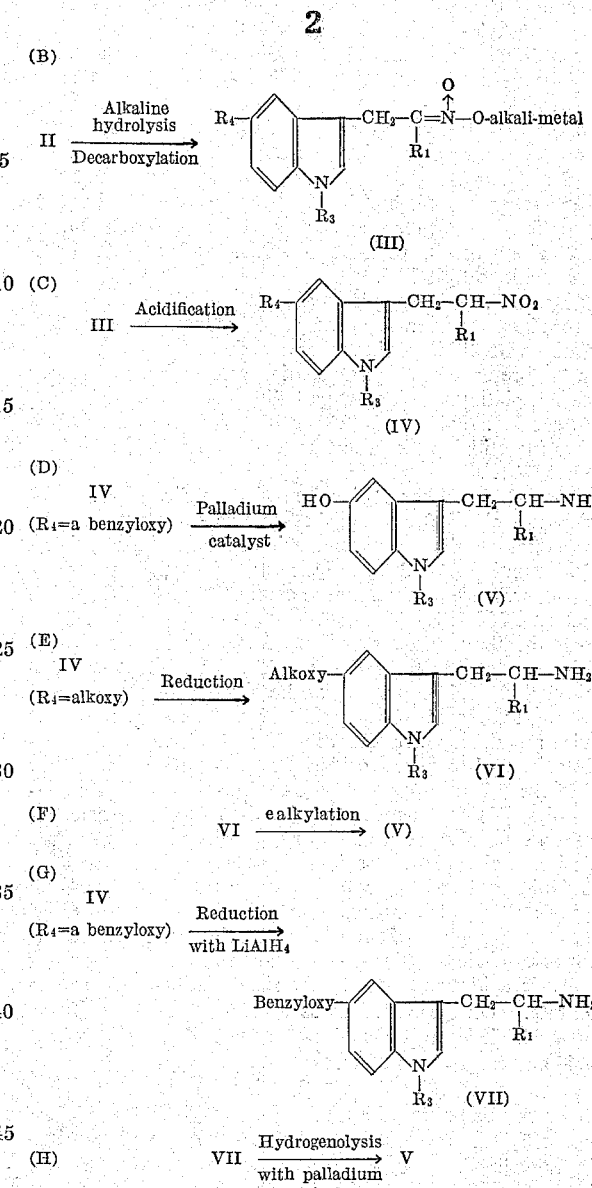

The process for the preparation of 5-hydroxy-3-(2-amino-2-monoalkylethyl)-indoles (V) involves the following steps:

A. Nitroalkylating a 3-(dialkylaminomethyl)-indole (I), e.g., 5-benzyloxy-3-(dimethylaminomethyl)-indole, with an alkyl ester of α-nitro-α-alkylacetic acid, such as ethyl α-nitro-α-methylacetate, ethyl α-nitro-α-isobutylacetate, methyl α-nitro-α-ethylacetate, propyl α-nitro-α-methylacetate, and the like, to produce an alkyl ester of α-alkyl-α-nitro-3-indolepropionic acid (II), e.g., ethyl 5-benzyloxy - α - methyl-α-nitro-3-indolepropionate. The nitroalkylation can be carried out according to the process disclosed in U.S. Patents 2,557,041 and 2,616,896.

B. Hydrolyzing and decarboxylating the alkyl ester (II) with an alkali such as sodium hydroxide, potassium hydroxide, and the like, to produce an alkali-metal salt of 3-(2-acinitro-2-monoalkylethyl)-indole (III), e.g., the sodium salt of 5-benzyloxy-3-(2-acinitro-2-methylethyl)-indole. The hydrolysis and decarboxylation can be carried out according to the process disclosed in U.S. Patent 2,616,896.

C. Acidifying the alkali-metal salt (III) with an acid such as hydrochloric acid, acetic acid, nitric acid, phosphoric acid, and the like, to produce a 3-(2-nitro-2-monoalkylethyl)-indole (IV), i.e., 5-benzyloxy-3-(2-nitro-2-methylethyl)-indole. The acidification can be carried out according to the process disclosed in U.S. Patent 2,616,896.

The 3-(2-nitro-2-monoalkylethyl)-indole (IV) can be converted to a 5-hydroxy-3-(2-amino-2-monoalkylethyl)-indole (V) in a variety of ways depending on whether $R_4$ is an alkoxy or a benzyloxy substituent.

D. When $R_4$ is a benzyloxy radical the concomitant conversion can be accomplished by hydrogenolysis and hydrogenation in the presence of a palladium catalyst such as palladium black, palladium-barium sulfate, palladium-charcoal, and the like.

E and F. When $R_4$ is an alkoxy radical the conversion can take place in two steps, e.g., (1) reduction of the nitro group with lithium aluminum hydride or with hydrogen in the presence of a hydrogenation catalyst such as Raney nickel, platinum oxide, or palladium, as disclosed in U.S. Patent 2,557,041, and (2) dealkylation with aluminum chloride utilizing the procedure of Asero et al. (Ann. 576, 69, 1952).

G and H. When $R_4$ is a benzyloxy radical the conversion can also be accomplished in two steps such as (1) reduction of the nitro group with lithium aluminum hydride, and (2) hydrogenolysis of the benzyloxy radical in the presence of a palladium catalyst as disclosed in U.S. Patent 2,708,197.

In the above process 5-alkoxy-3-(2-amino-2-monoalkylethyl)-indoles (VI) and 5-benzyloxy-3-(2-amino-2-monoalkylethyl)-indoles (VII) can be advantageously isolated as non-toxic acid addition salts by reacting the free base with a stoichiometric quantity of an acid, such as hydrochloric, hydrobromic, sulfuric, acetic, tartaric, citric, or the like. The 5-hydroxy-3-(2-amino-2-monoalkylethyl)-indoles (V) can also be converted to non-toxic acid addition salts, if so desired. For example, a solution of the desired acid addition salt can be prepared by mixing stoichiometric amounts of a free base of the invention with an organic or inorganic acid in the presence of water. Examples of acids are hydrochloric, hydrobromic, tartaric, citric, acetic, sulfuric, as well as a mixture of sulfuric acid and a stoichiometric quantity of creatinine sulfate. The preferred acids are hydrochloric, sulfuric, tartaric, citric, acetic, as well as the mixture of sulfuric acid and creatinine sulfate.

The novel 5-hydroxy-3-(2-amino-2,2-dialkylethyl)-indoles can be prepared by nitroalkylating a 3-(dialkylaminomethyl)-indole (I) with a nitroalkane instead of utilizing an alkyl ester of α-nitro-α-alkylacetic acid as shown in the process outlined above. The process which can be employed is disclosed by Snyder et al., J. Am. Chem. Soc. 69, 3140, 1947. The nitroalkanes which can be employed include those compounds wherein the nitro radical is attached to a carbon atom containing one active hydrogen. Nitroalkanes which can be used include, e.g., 2-nitropropane, 2-nitrobutane, 3-nitropentane, 2-methyl-3-nitroheptane, and the like. The nitroalkylation results in the preparation of 3-(2-nitro-2,2-dialkylethyl)-indoles which can be converted to 3-(2-amino-2,2-dialkylethyl)-indoles in the same manner as the above-identified 3-(2-nitro-2-monoalkylethyl)-indoles (IV) are converted to 3-(2-amino-2-monoalkylethyl)-indoles (V). The 3-(2-amino-2,2-dialkylethyl)-indoles can also be converted to acid addition salts, if so desired, in the same manner as the 3-(2-amino-2-monoalkylethyl)-indoles, noted above.

The starting 3-(dialkylaminomethyl)-indoles (I) can be prepared by reacting a suitably substituted indole with a dialkylamine in the presence of formaldehyde. For example, the procedures disclosed by Ek et al. (J. Am. Chem. Soc. 76, 5579, 1954), Rydon et al. (J. Chem. Soc. 2462, 1951), and Bell et al. (J. Org. Chem. 13, 547, 1948), who show the preparation of 5-benzyloxy-3-(dimethylaminomethyl)-indole, 5 - ethoxy-3-(dimethylaminomethyl)-indole, and 5-methoxy-3-(dimethylaminomethyl)-indole, respectively, can be employed.

The starting indoles suitably substituted in the 1 or 5-position can be prepared according to the following procedures:

(1) The 5-benzyloxyindoles are prepared in the manner disclosed by Burton et al., J. Chem. Soc. 1726, 1937.

(2) The 5-alkoxyindoles are prepared by the procedure outlined by Blaikie et al. (J. Chem. Soc. 296, 1924) for the preparation of 5-methoxyindole by utilizing the requisite alkoxy-2-nitrotoluene.

The 1-alkyl-5-substituted indoles can be prepared by the process described by Baker, J. Chem. Soc. 458, 1940, or Potts et al., J. Chem. Soc. 2641, 1954, wherein the 1-alkyl substituent is added by reacting a 1-unsubstituted indole with an alkyl halide in the presence of an alkali-metal alkoxide or amide.

Representative indoles which can be employed to produce 3-(dialkylaminomethyl)-indoles include the following: 5-benzyloxyindole, 5-ethoxyindole, 5-(para-methylbenzyloxy)-indole, 5-benzhydryloxyindole, 5-(para,para'-dimethylbenzhydryloxy)-indole, 5 - (para-ethoxybenzyloxy)-indole, 5-methoxyindole, 5-propoxyindole, 5-isopropoxyindole, 5-butoxyindole, 1-methyl-5-benzyloxyindole, 1-ethyl-5-ethoxyindole, 1-propyl-5-propoxyindole, 1-propyl-5-(para-propylbenzyloxy) - indole, 1-methyl-5-(para-chlorobenzyloxy)-indole, 1 - methyl-5-methoxyindole, and the like.

The alkyl esters of α-nitro-α-alkylacetic acid utilized in the preparation of the alkyl esters of α-alkyl-α-nitro-3-indolepropionic acid (II) can be produced utilizing the procedure of Kornblum et al., J. Am. Chem. Soc. 77, 6654, 1955, who show the preparation of ethyl α-nitropropionate and ethyl α-nitrobutyrate.

The 5 - hydroxy - 3 - (2 - amino - 2 - monoalkylethyl)-indoles and 5 - hydroxy-3-(2 - amino-2,2-dialkylethyl)-indoles of the present invention have shown valuable oxytocic activity. The 5-hydroxy-3-(2-amino-2-monoalkylethyl)-indoles and 5-hydroxy-3-(2-amino-2,2-dialkylethyl)-indoles of the present invention have also demonstrated the ability to resist oxidative deamination by the enzyme, monamine oxidase, to an excellent degree. These compounds have not only demonstrated this valuable property of being able to resist oxidative deamination but, moreover, they are also able to inhibit the enzymatic destruction of other amines which are normally affected by the enzyme. For example, serotonin [5-hydroxy-3-(2-aminoethyl)-indole creatinine sulfate] is materially affected by monamine oxidase. The ready deamination of serotonin by the enzyme has been reported by Govier et al., Science 118, 596, 1953 and Blaschko et al., J. Physiol. 122, 403, 1953. It is obvious that if adequate levels of serotonin in the body are to be maintained then the enzymatic activity must be eliminated or reduced. For example, the desirability of proper serotonin-level maintenance in the brain has been reported by Woolley, Science 125, 752 (1957). The 5-hydroxy-3-(2-amino-2-monoalkylethyl)-indoles and 5-hydroxy-3-(2-amino-2,2-dialkylethyl)-indoles of the present invention are able to provide this highly desirable protective property. Table I shows the results obtained when varying concentrations of 5-hydroxy-3-(2-amino-2-methylethyl)-indole (I) or 5-hydroxy-3-(2-amino-2,2-dimethylethyl)-indole (II) are combined with serotonin and the mixture subjected to monamine oxidase activity. The monamine oxidase activity was measured by the manometric procedure of Bhagvat et al., Biochem. J., 33, 1338, 1939. The source of enzyme was the guinea pig liver and the oxygen consumption of the liver alone, nineteen cubic millimeters, is subtracted in every case. The concentration of serotonin in each example is 0.0063 mole.

TABLE I

| | Molar Concentration | Mm.³ O₂ consumed in 50 minutes | Percent Inhibition |
|---|---|---|---|
| Serotonin | 0.0063 | 159 | |
| Inhibitor: | | | |
| I | 0.0124 | 52 | 76 |
| | 0.0041 | 94 | 47 |
| | 0.0013 | 123 | 26 |
| | 0.0004 | 140 | 14 |
| II | 0.04 | 66 | 66 |
| | 0.02 | 92 | 48 |
| | 0.01 | 114 | 32 |
| | 0.006 | 135 | 17 |
| | 0.003 | 144 | 11 |

Thus it is seen that when serotonin is combined with varying concentrations of 5-hydroxy-3-(2-amino-2-methylethyl)-indole or 5-hydroxy-3-(2-amino-2,2-dimethylethyl)-indole, oxygen consumption is reduced, which is a clear indication that monamine oxidase destruction of the pharmacologically active serotonin has been inhibited.

Further, the 5-hydroxy-3-(2-amino-2-monoalkylethyl)-indoles and 5-hydroxy-3-(2-amino-2,2-dialkylethyl)-indoles of the present invention are also potent inhibitors of decarboxylase enzymes. For example, the compounds inhibit the system 5-hydroxytryptophan decarboxylase which is responsible for the conversion of 5-hydroxytryptophan to serotonin in the body. [Udenfriend et al., J. Biol. Chem. 224, 803 (1957)]. 5-hydroxytryptophan is known to be the precursor of serotonin released in the brain [serotonin itself does not cross the blood-brain barrier; see Fed. Proc. 15, 402 and 493 (1957)].

Hence the compounds of the present invention, which inhibit both the enzyme responsible for the formation of serotonin and also the enzyme responsible for its destruction, provide a means for regulating the supply of serotonin to the brain and also of regulating the rate at which serotonin in the brain is destroyed.

The novel compounds of the invention also inhibit other decarboxylases. Illustratively, the compounds of the invention inhibit the enzyme system dihydroxyphenylalanine decarboxylase and like decarboxylases, thus providing means of regulating bodily levels, including brain levels, of pharmacologically active amines such as dopamine, epinephrine, and norepinephrine. The regulation of serotonin, dopamine, epinephrine, norepinephrine, etc., is useful in the management of abnormal conditions such as mental disease, inflammations, allergies and gastrointestinal hypermotility.

The activity of the compounds of the invention as enzyme inhibitors also makes them valuable as laboratory agents. Thus the compounds of the invention can be used in the research laboratory to inhibit selectively monoamine oxidase and/or decarboxylase enzymes in mixed enzyme systems. They can also be used in the characterization and quantitative determination of monoamine oxidase and decarboxylase enzymes in the laboratory.

The compounds of the present invention are suitably administered in unit dosage form as tablets, pills, capsules, powders, granules, sterile parenteral solutions or suspensions in aqueous or oil vehicles, oral aqueous or oil dispersions including syrups and elixirs, and the like. For preparing solid compositions such as tablets, the active ingredient is mixed with conventional tableting ingredients such as corn starch, lactose, dicalcium phosphate, talc, stearic acid, magnesium stearate, gums, and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication.

The liquid forms in which the novel compositions of the present invention can be incorporated for administration include aqueous solutions, suitably flavored syrups, aqueous suspensions, emulsions or suspensions with edible oils such as cottonseed oil, sesame oil, coconut oil, peanut oil and the like, a well as elixirs. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like.

The dosage of active ingredient dispersed in a pharmaceutically and physiologically acceptable carrier for oral or parenteral administration ranges from about 2.5 to about 200 mg. given one to four times daily. For treating mild depressive state the preferred oral dose, administered one to four times a day, is from about 10 to about 50 mg.

The following examples are illustrative of the process and products of the present invention, but are not to be construed as limiting.

EXAMPLE 1

*Preparation of 5-hydroxy-3-(2-amino-2-methylethyl)-indole creatinine sulfate*

A. *5 - benxyloxy - 3 - (dimethylaminomethyl) - indole.*—Fifty milliliters of dioxane and fifty milliliters of glacial acetic acid were placed in a one-liter, three-necked flask equipped with a stirrer, condenser, and addition funnel. The solution was cooled in an ice-bath and four milliliters of thirty percent aqueous formaldehyde solution was added with stirring, followed by eleven milliliters of 25 percent aqueous dimethylamine solution. 5-benzyloxyindole (11.15 grams) was dissolved in fifty milliliters of dioxane and added dropwise to the reaction mixture. The cooled solution was then stirred for two hours. The ice-bath was then removed and stirring was continued at about 25 degrees centigrade for about ten hours.

Water (625 milliliters) was added to the reaction mixture along with five grams of diatomaceous earth and five grams of decolorizing carbon. The mixture was filtered through five grams of diatomaceous earth on a coarse sintered funnel. The resulting slightly cloudy solution was cooled with ice. A cold solution of forty grams of sodium hydroxide in 500 milliliters of water was added. The mixture was kept in ice for about one hour, was filtered, and the precipitate was washed with water.

The precipitate, 5-benzyloxy-3-(dimethylaminomethyl)-indole, was dried at 25 degrees centigrade. The yield was 13.1 grams (93.5 percent) and the compound melted at 134 to 139 degrees centigrade.

B. *Ethyl 5-benzyloxy-α-methyl-α-nitro-3-indolepropionate.*—A mixture of 9.76 grams of 5-benzyloxy-3-(dimethylaminoethyl)-indole, 5.13 grams of ethyl α-nitro-α-methylacetate (Kornblum et al., J. Am. Chem. Soc. 77, 6654, 1955), and 58 milliliters of anhydrous toluene was stirred and refluxed for three and one-half hours while passing a rapid stream of nitrogen through the mixture. The mixture was cooled to 25 degrees centigrade and 100 milliliters of chloroform was added. The cooled mixture was successively washed with two thirty-milliliter portions of ten percent hydrchloric acid, once with thirty milliliters of water, twice with thirty milliliters of five percent aqueous potassium hydroxide solution, once with thirty milliliters of water, and once with saturated aqueous sodium chloride solution. The mixture was then dried over anhydrous sodium sulfate and evaporated to dryness to yield 12.8 grams (97 percent), of ethyl 5-benzyloxy-α-methyl-α-nitro-3-indolepropionate as a brown oil.

C. *Sodium salt of 5-benzyloxy-3-(2-acinitro-2-methylethyl)-indole.*—A solution of 3.6 grams of sodium hydroxide in ten milliliters of water was added to a solution of 12.8 grams of ethyl 5-benzyloxy-α-methyl-α-nitro-3-indolepropionate in 53 milliliters of absolute ethanol. The mixture was allowed to stand at 25 degrees centigrade for 24 hours. The resulting suspension was then diluted with ten milliliters of absolute ethanol, filtered, and the precipitate was washed with two ten-milliliter portions of ethanol and then with a total of forty milliliters of ether. The resulting solid, the sodium salt of 5-benzyloxy-3-(2-acinitro-2-methylethyl)-indole, weighed 12.28 grams. A 1.5 gram sample of the sodium salt was further purified by slurrying the crude salt in ten milliliters of water, filtering the resulting suspension, and washing the precipitate slowly with three milliliters of water. The slightly wet solid was mixed with acetone and heated on a steam bath. Warm water was added to the mixture until the solution cleared, followed by addition of warm acetone until precipitation occurred. The mixture was cooled in an ice bath and filtered. The purified sodium salt precipitate weighed 1.1 grams and melted at 112 to 115 degrees centigrade.

*Analysis.*—Calcd. for $C_{18}H_{17}N_2O_3Na$: Na, 6.92. Found: Na, 6.51.

D. *5-benzyloxy-3-(2-nitro-2-methylethyl)-indole.*—The sodium salt of 5-benzyloxy-3-(2-acinitro-2-methylethyl)-indole (approximately 12.18 grams) was dissolved in one liter of water by warming to forty degrees centigrade. The solution was cooled to about seven degrees centigrade and acidified with 25 milliliters of ten percent hydrochloric acid while cooling. The resulting precipitate was filtered and washed with 100 milliliters of water, and the precipitate was dried by suction and allowed to stand at 25 degrees centigrade for 56 hours. The resulting product was dissolved in 150 milliliters of ether. The ether solution was dried over anhydrous magnesium sulfate and concentrated to produce 7.5 grams of 5-benzyloxy-3-(2-nitro-2-methylethyl)-indole as an oil which later crystallized. This compound, after two recrystallizations from ether-petroleum ether mixture, melted at 83 to 85 degrees centigrade.

*Analysis.*—Calcd. for $C_{18}H_{18}N_2O_3$: C, 69.66; H, 5.85; N, 9.03. Found: C, 70.15; H, 6.11; N, 9.27.

E. *5-benzyloxy-3-(2-amino-2-methylethyl)-indole hydrochloride.*—A solution of 7.5 grams of 5-benzyloxy-3-(2-nitro-2-methylethyl)-indole and fifty milliliters of anhydrous ether was added to a solution of ten grams of lithium aluminum hydride and 600 milliliters of ether with stirring and ice-bath cooling. The resulting suspension was refluxed for two and one-half hours and allowed to stand for ten hours at 25 degrees centigrade. The mixture was then cooled in ice and fifty milliliters of water was added, followed by a large excess of fifteen percent aqueous potassium hydroxide solution. The water layer was separated from the ether layer and was extracted with ether. The ether extract was combined with the ether layer and the mixture was washed with water, dried over anhydrous sodium sulfate, and evaporated to about 100 milliliters. Eight milliliters of saturated ethereal hydrogen chloride was then added while swirling in the cold. The resulting precipitate was filtered, washed with ether, and recrystallized by dissolving in 110 milliliters of warm methanol and adding 420 milliliters of ether. The mixture was allowed to stand for ten hours in the cold, filtered, and washed with ether to yield 4.58 grams of 5-benzyloxy-3-(2-amino-2-methylethyl)-indole hydrochloride which melted at 253 to 254 degrees centigrade.

*Analysis.*—Calcd. for $C_{18}H_{21}ClN_2O$: C, 68.23; H, 6.68; N, 8.84; Cl, 11.19. Found: C, 68.39; H, 6.65; N, 8.66; Cl, 10.95.

F. *5-hydroxy-3-(2-amino-2-methylethyl)-indole creatinine sulfate.*—Two-tenths of a gram of 5-benzyloxy-3-(2-amino-2-methylethyl)-indole hydrochloride was suspended in ten milliliters of water, three milliliters of ten percent aqueous potassium hydroxide solution was added and the resulting oil was extracted twice with ether. The ethereal extract was washed twice with water, once with saturated aqueous sodium chloride solution, and then dried over anhydrous sodium sulfate and evaporated to dryness. A yellow amorphous material (0.128 gram) was obtained. The amorphous material was dissolved in ten milliliters of ethanol and the solution was shaken for two hours at atmospheric pressure in the presence of hydrogen and 0.1 gram of ten percent palladium-on-carbon catalyst. The mixture was filtered and evaporated to dryness. The residue was then dissolved in 0.7 milliliter of 1 N sulfuric acid and two milliliters of water. The resulting solution was filtered to remove a small amount of solid material (one milliliter of water was used to wash), and 86.5 milligrams of creatinine sulfate was added. The solution was frozen and the solvent was removed from the frozen mass under high vacuum. The product, 5-hydroxy-3-(2-amino-2-methylethyl)-indole creatinine sulfate, was thus obtained as a light tan solid. The ultraviolet and infrared spectra were in conformance with the structure of 5-hydroxy-3-(2-amino-2-methylethyl)-indole creatinine sulfate.

EXAMPLE 2

*Preparation of 5-hydroxy-3-(2-amino-2,2-dimethylethyl)-indole creatinine sulfate*

A. *5-benzyloxy-3-(2-nitro-2,2-dimethylethyl)-indole.*—Twenty grams of 5-benzyloxy-3-(dimethylaminomethyl)-indole, 100 milliliters of 2-nitropropane and 5.2 grams of solid sodium hydroxide was agitated by a slow stream of nitrogen and refluxed for approximately eight hours until the evolution of dimethylamine ceased. The reaction mixture was cooled and fifty milliliters of ten percent aqueous acetic acid solution was added. The mixture became warm and the solid dissolved. A 200-milliliter quantity of ether was added and the layers were separated. The ether layer was washed four times with water. A mixture of anhydrous magnesium sulfate, Darco 60 (activated carbon) and a filter aid was added, and the mixture was filtered. The solvent was removed under reduced pressure and the residue crystallized upon trituration with ether. The crude crystalline product was recrystallized from benzene to yield 16.4 grams of 5-benzyloxy-3-(2-nitro-2,2-dimethylethyl)-indole which melted at 114 to 115 degrees centigrade. After recrystallization from ethanol the compound melted at 114.5 to 116.5 degrees centigrade.

*Analysis.*—Calcd. for $C_{19}H_{20}N_2O_3$: C, 70.35; H 6.21; N, 8.64. Found: C, 70.46; H, 5.98; N, 8.80.

B. *5-hydroxy-3-(2-amino-2,2-dimethylethyl)-indole.*—A solution of 5.0 grams of 5-benzyloxy-3-(2-nitro-2,2-dimethylethyl)-indole, 200 milliliters of absolute methanol, approximately 1.0 gram of ten percent palladium-on-charcoal catalyst was shaken for twenty hours under fifty pounds initial hydrogen pressure. When four mole equivalents of hydrogen were absorbed the mixture was filtered through celite and the filtrate was concentrated to dryness under reduced pressure. The solid, 5-hydroxy-3-(2-amino-2,2-dimethylethyl)-indole, melted at 74 to 84 degrees centigrade, resolidified, and decomposed upon further heating.

*Analysis.*—Calcd. for $C_{12}H_{16}N_2O \cdot \frac{1}{2}CH_3OH$: C, 68.15; H, 8.23; N, 12.71. Found: C, 68.47; H, 7.95; N, 12.79.

In the same manner as shown in Example 1, Part F, 5-hydroxy-3-(2-amino-2,2-dimethylethyl)-indole creatinine sulfate was prepared by using 5-hydroxy-3-(2-amino-2,2-dimethylethyl)-indole in lieu of 5-hydroxy-3-(2-amino-2-methylethyl)-indole.

EXAMPLE 3

*Preparation of 5-hydroxy-3-(2-amino-2,2-diethylethyl)-indole creatinine sulfate*

In the same manner as shown in Example 2, 5-methoxy-3-(2-nitro-2,2-diethylethyl)-indole was prepared by utilizing 5-methoxy-3-(dimethylaminomethyl)-indole (Bell et al., J. Org. Chem. 13, 547, 1948), and 3-nitropentane in place of 5-benzyloxy-3-(dimethylaminomethyl)-indole and 2-nitro-propane. The resulting 5-methoxy-3-(2-nitro-2,2-diethylethyl)-indole was reduced with lithium aluminum hydride and the reduced product was reacted with gaseous hydrogen chloride to produce 5-methoxy-3-(2-amino-2,2-diethylethyl)-indole hydrochloride.

The resulting 5-methoxy-3-(2-amino-2,2-diethylethyl)-indole hydrochloride was reacted with potassium hydroxide to prepare the free base. The free base was dealkylated with aluminum chloride utilizing the procedure of Asero et al., supra, to produce 5-hydroxy-3-(2-amino-2,2-diethylethyl)-indole and the free base was reacted with sulfuric acid and creatinine sulfate to produce 5-hydroxy-3-(2-amino-2,2-diethylethyl)-indole creatinine sulfate.

EXAMPLE 4

*Preparation of 5-hydroxy-3-(2-amino-2,2-dipropylethyl)-indole hydrochloride*

5-(para-methylbenzyloxy)-indole was prepared using the procedure of Burton et al., supra, and 5-(para-methylbenzyloxy) - 3 - (dimethylaminomethyl)-indole was prepared in the manner disclosed in Example 1, by using 5-(para-methylbenzyloxy)-indole in lieu of 5-benzyloxyindole.

In the same manner as disclosed in Example 2, 5-(para-methylbenzyloxy) - 3 - (2-nitro-2,2-dipropylethyl)-indole was prepared by using 5-para-methylbenzyloxy)-3-(dimethylaminomethyl)-indole and 4-nitroheptane in place of 5-benzyloxy-3-(dimethylaminomethyl)-indole and 2-nitropropane. The resulting 5-(para-methylbenzyloxy) - 3 - (2-nitro-2,2-dipropylethyl)-indole was reduced with lithium aluminum hydride to produce 5-(para-methylbenzyloxy) - 3-(2-amino-2,2-dipropylethyl)-indole, and the latter was debenzylated with hydrogen and palladium-on-carbon catalyst to produce 5-hydroxy-3-(2-amino - 2,2- - dipropylethyl) - indole. The debenzylated product was reacted in absolute ethanol with hydrogen chloride to produce 5-hydroxy-3-(2-amino-2,2-dipropylethyl)-indole hydrochloride.

EXAMPLE 5

*Preparation of 5-hydroxy-3-(2-amino-2-butylethyl)-indole creatinine sulfate*

In the same manner as shown in Example 1, 5-ethoxy-3-(2-nitro-2-butylethyl)-indole was prepared by utilizing 5-ethoxy-3-(dimethylaminomethyl)-indole (J. Chem. Soc. 2462, 1955) and ethyl α-nitro-α-butylacetate instead of 5-benzyloxy-3-(dimethylaminomethyl)-indole and ethyl α-nitro-α-methylacetate. The thus-produced compound was reduced with lithium aluminum hydride to produce 5-ethoxy-3-(2-amino-2-butylethyl)-indole and the reduced product was dealkylated with aluminum chloride according to the procedure of Asero et al., supra, and then reacted with creatinine sulfate and sulfuric acid to produce 5-hydroxy-3-(2-amino-2-butylethyl)-indole creatinine culfate.

EXAMPLE 6

*Preparation of 5-hydroxy-3-(2-amino-2,2-dibutylethyl)-indole creatinine sulfate*

5-(para-chlorobenzyloxy)-indole was prepared using the procedure of Burton et al., supra, and 5-(para-chlorobenzyloxy) - 3-(dimethylaminomethyl)-indole was prepared in the manner disclosed in Example 1 by using 5-(para-chlorobenzyloxy)-indole in lieu of 5-benzyloxyindole.

In the same manner as disclosed in Example 2, 5-(para-chlorobenzyloxy)-3-(2-nitro-2,2-dibutylethyl)-indole was prepared by using 5-(para-chlorobenzyloxy)-3-(dimethylaminomethyl)-indole and 5-nitrononane in place of 5-benzyloxy-3-(dimethylaminomethyl)-indole and 2-nitropropane.

The resulting 5-(para-chlorobenzyloxy) - 3 - (2-nitro-2,2-dibutylethyl)-indole was reduced with lithium aluminum hydride to produce 5 - (para - chlorobenzyloxy)-3-(2-amino-2,2-dibutylethyl)-indole and the latter was debenzylated with hydrogen and palladium-on-carbon catalyst to produce 5-hydroxy-3-(2-amino-2,2-dibutylethyl)-indole. The debenzylated product was reacted with creatinine sulfate and sulfuric acid to produce 5-hydroxy-3-(2-amino-2,2-dibutylethyl)-indole creatinine sulfate.

EXAMPLE 7

*Preparation of 5-hydroxy-3-(2-amino-2-ethylethyl)-indole hydrochloride*

5-propoxyindole was prepared using the procedure of Blaikie et al., supra, and 5-propoxy-3-(dimethylaminomethyl)-indole was prepared in the manner disclosed in Example 1 by using 5-propoxyindole in lieu of 5-benzyloxyindole.

In the same manner as disclosed in Example 1, 5-propoxy-3-(2-nitro-2-ethylethyl)-indole was prepared by utilizing 5-propoxy-3-(dimethylaminomethyl)-indole and ethyl α-nitro-α-ethylacetate instead of 5 - benzyloxy-3-(dimethylaminomethyl) - indole and ethyl α - nitro-α-methylacetate. The thus-produced compound was reduced with lithium aluminum hydride to produce 5-propoxy-3-(2-amino-2-ethylethyl)-indole. The reduced product was dealkylated with aluminum chloride according to the procedure of Asero et al., supra, and then reacted in aqueous medium with hydrogen chloride to produce 5-hydroxy-3-(2-amino - 2 - ethylethyl)-indole hydrochloride.

EXAMPLE 8

*Preparation of 5-hydroxy-3-(2-amino-2-ethyl-2-methylethyl)-indole sulfate*

5-butoxyindole was prepared using the procedure of Blaikie et al., supra, and 5-butoxy-3-(dimethylaminomethyl)-indole was prepared in the manner disclosed in Example 1 by using 5-butoxyindole in lieu of 5-benzyloxyindole.

In the same manner as disclosed in Example 2, 5 - butoxy - 3 -(2 - nitro - 2 - ethyl - 2 - methylethyl)-indole was prepared by using 5 - butoxy - 3 - (dimethylaminomethyl)-indole and 2-nitrobutane instead of 5-benzyloxy - 3 - (dimethylaminomethyl)-indole and 2-nitropropane. The thus-produced compound was reduced with lithium aluminum hydride to produce 5-butoxy-3-(2-amino-2-ethyl - 2 - methylethyl)-indole. The reduced product was dealkylated with aluminum chloride according to the procedure of Asero et al., supra, to produce 5-hydroxy-3-(2-amino-2-ethyl - 2 - methylethyl) - indole. The dealkylated product was reacted in aqueous medium with sulfuric acid to produce 5-hydroxy-3-(2-amino-2-ethyl-2-methylethyl)-indole sulfate.

EXAMPLE 9

*Preparation of 1-methyl-5-hydroxy-3-(2-amino-2-methylethyl)-indole creatinine sulfate*

A. *1-methyl-5-benzyloxyindole.*—1-methyl - 5 - benzyloxyindole was prepared by reacting 5-benzyloxyindole with methyl bromide in the presence of sodium ethoxide in the manner disclosed by Baker, supra.

B. *1-methyl-5-benzyloxy - 3 - (dimethylaminomethyl)-indole.*—A solution of fifteen milliliters of dioxane and fifteen milliliters of acetic acid was cooled to ten degrees centigrade and 1.2 milliliters of 37 percent aqueous formaldehyde solution was added. The solution was stirred and 3.3 milliliters of 25 percent dimethylamine was added. The solution was further cooled and a solution of 3.35 grams of 1-methyl-5-benzyloxyindole and fifteen milliliters of dioxane was added over thirty minutes. The solution was allowed to stand for ten hours and then was mixed with 187 milliliters of water and filtered. The filtrate was mixed with a cold solution of 14.0 grams of potassium hydroxide and 150 milliliters of water, and the mixture was cooled and filtered. The precipitate was washed with water and was dried to yield 3.3 grams (eighty percent) of 1-methyl-5-benzyloxy-3-(dimethylaminomethyl)-indole. A sample was refluxed with activated carbon in alcohol and filtered. The filtrate was diluted with water to precipitate the 1-methyl-5-benzyloxy - 3 - (dimethylaminomethyl) - indole which melted between 48 and 50 degrees centigrade.

*Analysis.*—Calcd. for $C_{19}H_{22}N_2O$: C, 77.51; H, 7.53; N, 9.51. Found: C, 78.08; H, 7.86; N, 9.69.

C. *1-methyl-5-benzyloxy-3-(2-amino - 2 - methylethyl)-indole.*—In the same manner as disclosed in Example 1, 1-methyl - 5 - benzyloxy - 3 - (2-nitro - 2 - methylethyl)-indole was prepared by utilizing propyl α-nitro-α-methylacetate and 1-methyl-5-benzyloxy - 3 - (dimethylaminomethyl)-indole in place of 5-benzyloxy - 3 - (dimethylaminomethyl)-indole and ethyl α-nitro-α-methylacetate. The resulting 1-methyl-5-benzyloxy-3-(2-nitro-2-methylethyl)-indole was reduced with lithium aluminum hydride to produce 1-methyl - 5 - benzyloxy-3-(2-amino-2-methylethyl)-indole which melted between 62 and 64 degrees centigrade.

*Analysis.*—Calcd. for $C_{19}H_{22}N_2O$: C, 77.51; H, 7.53; N, 9.51. Found: C, 77.87; H, 7.29; N, 9.67.

D. *1-methyl-5-hydroxy-3-(2-amino - 2 - methylethyl)-indole creatinine sulfate.*—A mixture of 1.0 gram of 1-methyl-5-benzyloxy-3-(2-amino - 2 - methylethyl)-indole, 150 milliliters of absolute methanol, and approximately 300 milligrams of ten percent palladium-on-carbon catalyst was subjected to hydrogen pressure at fifty pounds for eight hours. The mixture was treated with 3.5 milliliters of one normal sulfuric acid and filtered. The filtrate was concentrated to dryness under reduced pressure at 40–50 degrees centigrade. The dark residue was dissolved in 16.4 milliliters of water, treated with a trace of activated carbon and filtered. The flask and solids were washed with five milliliters of water. A 500-milligram quantity of creatinine sulfate was added to the combined filtrates. The filtrate was heated to about fifty degrees centigrade and 105 milliliters of boiling acetone was added. After refrigeration 100 milligrams of creatinine sulfate was precipitated. The mixture was filtered and the filtrate was further diluted with acetone. After two days at five degrees centigrate, 500 milligrams (35 percent) of product, 1-methyl - 5 - hydroxy-3-(2-amino-2-methylethyl)-indole creatinine sulfate was collected which was 91 percent pure by ultraviolet assay.

EXAMPLE 10

*Preparation of 1-ethyl-5-hydroxy-3-(2-amino-2,2-diethylethyl)-indole acetate*

1-ethyl-5-benzyloxyindole was prepared by reacting 5-benzyloxyindole with ethyl bromide in the presence of sodium ethoxide in the manner disclosed by Baker, supra.

In the same manner as disclosed in Example 1, 1-ethyl-5-benzyloxy-3 - (dimethylaminomethyl) - indole was prepared using 1-ethyl-5-benzyloxyindole in lieu of 5-benzyloxyindole.

In the same manner as disclosed in Example 2, 1-ethyl-5-benzyloxy-3-(2-nitro-2,2-diethylethyl) - indole was prepared using 1-ethyl-5-benzyloxy-3-(dimethylaminomethyl)-indole and 3-nitropentane in lieu of 5-benzyloxy-3-(dimethylaminomethyl)-indole and 2-nitropropane. The resulting 1-ethyl-5-benzyloxy-3-(2-nitro-2,2-diethylethyl)-indole was reduced with lithium aluminum hydride to produce 1-ethyl-5-benzyloxy-3-(2-amino-2,2-diethylethyl)-indole and the latter was debenzylated with hydrogen and palladium-on-carbon catalyst to produce 1-ethyl-5-hydroxy-3-(2-amino-2,2-diethylethyl)-indole. The debenzylated product was reacted in an ether-absolute ethanol mixture with acetic acid to produce 1-ethyl-5-hydroxy-3-(2-amino-2,2-diethylethyl)-indole acetate.

EXAMPLE 11

*Preparation of 1-butyl-5-hydroxy-3-(2-amino-2-butylethyl)-indole citrate*

5-butoxyindole was prepared using the procedure of Blaikie et al., supra, and 1-butyl-5-butoxyindole was prepared from 5-butoxyindole and butyl iodide in the presence of sodium ethoxide, using the procedure of Baker, supra.

In the same manner as disclosed in Example 1, 1-butyl-5-butoxy-3-(dimethylaminomethyl)-indole was prepared using 1-butyl-5-butoxyindole in lieu of 5-benzyloxyindole.

In the same manner as disposed in Example 1, 1-butyl-5-butoxy-3 - (2-nitro-2-butylethyl) - indole was prepared using 1-butyl-5-butoxy-3-(dimethylaminomethyl) - indole and ethyl α-nitro-α-butylacetate in lieu of 5-benzyloxy-3-(dimethylaminomethyl)-indole and ethyl α-nitro-α-methylacetate. The thus-produced compound was reduced with lithium aluminum hydride to produce 1-butyl-5-butoxy-3 - (2-amino-2-butylethyl) - indole. The reduced product was dealkylated with aluminum chloride according to the procedure of Asero et al., supra, and then reacted in absolute ethanol with citric acid to produce 1-butyl-5-hydroxy-3-(2-amino-2-butylethyl)-indole citrate.

EXAMPLE 12

*Preparation of 1-propyl-5-hydroxy-3-(2-amino-2,2-dipropylethyl)-indole creatinine sulfate*

5-isopropoxyindole was prepared using the procedure of Blaikie et al., supra, and 1-propyl-5-isopropoxyindole was prepared from 5-isopropoxyindole and propyl bromide in the presence of sodium ethoxide, using the procedure of Baker, supra.

In the same manner as disclosed in Example 1, 1-propyl-5-isopropoxy-3-(dimethylaminomethyl) - indole was prepared using 1-propyl-5-isopropoxyindole in lieu of 5-benzyloxyindole.

In the same manner as disclosed in Example 2, 1-propyl-5-isopropoxy-3-(2-nitro-2,2-dipropylethyl)-indole was prepared using 1-propyl-5-isopropoxy-3-(dimethylaminomethyl)-indole and 4-nitroheptane in lieu of 5-benzyloxy-3-(dimethylaminomethyl)-indole and 2-nitropropane. The thus-produced compound was reduced with lithium aluminum hydride to produce 1-propyl-5-isopropoxy-3-(2-amino-2,2-dipropylethyl)-indole. The reduced product was dealkylated with aluminum chloride according to the procedure of Asero et al., supra, and then reacted with creatinine sulfate and sulfuric acid to produce 1-propyl-5-hydroxy - 3-(2-amino-2,2-dipropylethyl)indole creatinine sulfate.

EXAMPLE 13

*Preparation of 1-butyl-5-hydroxy-3-(2-amino-2-methyl-2-propylethyl)-indole creatinine sulfate*

5-benzhydryloxyindole was prepared using the procedure of Burton et al., supra, and 1-butyl-5-benzhydrylyoxyindole was prepared from 5-benzhydryloxyindole and butyl iodide in the presence of sodium ethoxide, using the procedure of Baker, supra.

In the same manner as disclosed in Example 1, 1-butyl-5-benzhydryloxy-3 - (dimethylaminomethyl) - indole was prepared using 1-butyl-5-benzhydryloxyindole in lieu of 5-benzyloxyindole.

In the same manner as disclosed in Example 2, 1-butyl-5 - benzhydryloxy - 3 - (2-nitro-2-methyl-2-propylethyl)-indole was prepared using 1-butyl-5-benhydryloxy-3-(dimethylaminomethyl)-indole and 4-nitropentane in lieu of 5 - benzyloxy - 3 - (dimethylaminomethyl) - indole and 2-nitropropane. The resulting 1-butyl-5-benzhydryloxy-3-(2-nitro-2-methyl-2-propylethyl)-indole was reduced with lithium aluminum hydride to produce 1-butyl-5-benzhydryloxy-3 - (2-amino-2-methyl-2-propylethyl) - indole, and the latter was debenzylated with hydrogen and palladium-on-carbon catalyst to produce 1-butyl-5-hydroxy-3-(2-amino-2-methyl-2-propylethyl)-indole. The debenzylated product was reacted with creatinine sulfate and sulfuric acid to produce 1-butyl-5-hydroxy-3-(2-amino-2-methyl-2-propylethyl)-indole creatinine sulfate.

EXAMPLE 14

*Preparation of 5-hydroxy-3-(2-amino-2-methylethyl)-indole creatinine sulfate*

In the same manner as shown in Example 1, 5-methoxy-3-(2-nitro-2-methylethyl)-indole was prepared using 5-methoxy-3-(dimethylaminomethyl)-indole in lieu of 5-benzyloxy-3-(dimethylaminomethyl)-indole. The thus-produced compound was reduced with lithium aluminum hydride to produce 5-methoxy-3-(2-amino-2-methylethyl)-indole and the reduced product was reacted with acetic acid to produce 5-methoxy-3-(2-amino-2-methylethyl)-indole acetate which melted at 133–134.5° C. On recrystallization from ether-methanol the compound melted at 134–135° C.

*Analysis.*—Calcd. for $C_{14}H_{20}N_2O_3$: C, 63.61; H, 7.63; N, 10.60. Found: C, 63.78; H, 7.96; N, 10.56.

The resulting 5-methoxy-3-(2-amino-2-methylethyl)-indole acetate was reacted with potassium hydroxide to prepare the free base. The free base was dealkylated with aluminum chloride to produce 5-hydroxy-3-(2-amino-2-methylethyl)-indole and the latter compound was reacted with sulfuric acid and creatinine sulfate to produce 5-hydroxy-3-(2-amino-2-methylethyl)-indole creatinine sulfate.

EXAMPLE 15

*Preparation of 5-hydroxy-3-(2-amino-2-ethylethyl)-indole hydrochloride*

In the same manner as shown in Example 1, 5-methoxy-3-(2-nitro-2-ethylethyl)-indole was prepared using 5-methoxy-3-(dimethylaminomethyl)-indole and ethyl α-nitro-α-ethylacetate in lieu of 5-benzyloxy-3-(2-dimethylaminomethyl)-indole and ethyl α-nitro-α-methylacetate. The thus-produced compound was reduced with lithium aluminum hydride to produce 5-methoxy-3-(2-amino-2-ethylethyl)-indole. The reduced product was dealkylated with aluminum chloride and then reacted in aqueous medium with hydrogen chloride to produce 5-hydroxy-3-(2-amino-2-ethylethyl)-indole hydrochloride.

The following tablet composition is illustrative of the compositions of this invention:

Ten thousand tablets for oral use, each containing 25 mg. of 5-hydroxy-3-(2-amino-2-methylethyl)-indole, are prepared from the following types and amounts of materials:

| | Gm. |
|---|---|
| 5-hydroxy-3-(2-amino-2-methylethyl)-indole | 250 |
| Lactose, U.S.P. | 1225 |
| Sucrose, powdered, U.S.P. | 1225 |
| Corn starch, U.S.P. | 300 |

The finely powdered materials are mixed well and the mixture granulated with 10% starch paste. The wet mass is forced through an 8-mesh screen, dried at 110° F. in a forced-air oven and then put through a 12-mesh screen. As lubricant, 30 gm. of magnesium stearate is added before compressing into tablets. The tablets are effective in treating mild depressive states when administered in dosages of one to two tablets one to four times per day.

We claim:
1. A compound of the formula:

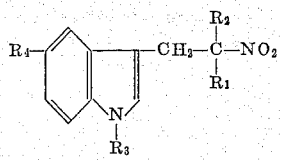

wherein $R_1$ represents alkyl of one to four carbon atoms, inclusive, $R_2$ and $R_3$ are selected from the group consisting of hydrogen and alkyl of 1 to 4 carbon atoms, inclusive, and $R_4$ is selected from the group consisting of alkoxy of up to 8 carbon atoms and benzyloxy of up to 15 carbon atoms and selected from the group consisting of benzyloxy, benzhydryloxy, alkylbenzyloxy, halobenzyloxy and alkoxybenzyloxy.

2. 5-benzyloxy-3-(2-nitro-2-methylethyl)-indole.
3. 5-benzyloxy-3-(2-nitro-2,2-dimethylethyl)-indole.
4. 1-methyl-5-benzyloxy-3-(2-nitro-2-methylethyl)-indole.

References Cited by the Examiner

UNITED STATES PATENTS

| | | | |
|---|---|---|---|
| 2,804,422 | 8/57 | Schumann et al. | 167—65 |
| 2,814,625 | 11/57 | Speeter | 260—319 |
| 2,870,162 | 1/59 | Speeter et al. | 260—319 |
| 2,873,281 | 2/59 | Rosen | 260—319 |
| 2,890,223 | 6/59 | Woolley et al. | 260—319 |
| 2,902,404 | 9/59 | Spencer | 167—65 |
| 2,995,566 | 8/61 | Sletzinger et al. | 260—319 |
| 3,042,684 | 7/62 | Young | 260—319 |
| 3,058,992 | 10/62 | Allais et al. | 260—319 |
| 3,072,530 | 1/63 | Hofmann et al. | 260—319 |

FOREIGN PATENTS

| | | |
|---|---|---|
| 744,773 | 2/56 | Great Britain. |
| 744,774 | 2/56 | Great Britain. |
| 807,876 | 1/59 | Great Britain. |
| 807,877 | 1/59 | Great Britain. |

OTHER REFERENCES

Young: J. Chem. Soc., pages 3493–3496 (1958).
Vane: British J. Pharmacology, vol. 14, pages 87–98 (1959).
New York Times, Wednesday, March 21, 1962.

IRVING MARCUS, *Primary Examiner.*

WALTER A. MODANCE, *Examiner.*